United States Patent
Kita

(10) Patent No.: US 8,977,472 B2
(45) Date of Patent: Mar. 10, 2015

(54) FUEL INJECTION CONTROL SYSTEM FOR DIRECT-INJECTION ENGINE

(75) Inventor: Masayuki Kita, Kariya (JP)

(73) Assignee: Denso Corporation, Kariya (JP)

( * ) Notice: Subject to any disclaimer, the term of this patent is extended or adjusted under 35 U.S.C. 154(b) by 907 days.

(21) Appl. No.: 13/183,772

(22) Filed: Jul. 15, 2011

(65) Prior Publication Data

US 2012/0022771 A1 Jan. 26, 2012

(30) Foreign Application Priority Data

Jul. 22, 2010 (JP) ................................ 2010-164757

(51) Int. Cl.
*F02D 41/30* (2006.01)
*F02D 28/00* (2006.01)
*F02D 41/32* (2006.01)
*F02D 41/34* (2006.01)

(52) U.S. Cl.
CPC ............... *F02D 41/32* (2013.01); *F02D 41/34* (2013.01); *Y02T 10/44* (2013.01)
USPC ....................................................... 701/104

(58) Field of Classification Search
CPC ................ F02D 41/40; F02D 41/402–41/405; Y02T 10/44
USPC .................................................. 701/103, 104
See application file for complete search history.

(56) References Cited

U.S. PATENT DOCUMENTS

| | | | | |
|---|---|---|---|---|
| 6,240,724 B1 * | 6/2001 | Kudou et al. | .................... | 60/284 |
| 6,269,791 B1 * | 8/2001 | Tanaka et al. | ................. | 123/300 |
| 6,343,585 B1 * | 2/2002 | Fujieda et al. | ................. | 123/295 |
| 6,434,929 B1 * | 8/2002 | Nishimura et al. | ............. | 60/278 |
| 6,539,916 B2 * | 4/2003 | Ueda et al. | ..................... | 123/295 |
| 6,725,829 B2 * | 4/2004 | Kataoka et al. | ................ | 123/299 |
| 6,745,743 B2 * | 6/2004 | Abo et al. | ....................... | 123/295 |
| 6,964,256 B2 * | 11/2005 | Kataoka et al. | ................ | 123/295 |
| 7,069,138 B2 | 6/2006 | Böhnig et al. | | |
| 7,379,810 B2 * | 5/2008 | Soga et al. | ..................... | 701/104 |
| 7,596,992 B2 * | 10/2009 | Asano et al. | ................ | 73/114.48 |
| 2001/0056322 A1 * | 12/2001 | Yoshizawa et al. | ........... | 701/104 |
| 2003/0121495 A1 * | 7/2003 | Abo et al. | ....................... | 123/295 |
| 2003/0230276 A1 * | 12/2003 | Kataoka et al. | ................ | 123/295 |
| 2007/0156322 A1 * | 7/2007 | Soga et al. | ..................... | 701/104 |
| 2008/0087251 A1 * | 4/2008 | Idogawa et al. | ................ | 123/445 |

FOREIGN PATENT DOCUMENTS

JP 2003-527527 9/2003

* cited by examiner

*Primary Examiner* — Hieu T Vo
*Assistant Examiner* — Arnold Castro
(74) *Attorney, Agent, or Firm* — Nixon & Vanderhye P.C.

(57) ABSTRACT

In an engine of a direct-injection type, a split injection (a fuel injection in an intake stroke and a fuel injection in a compression stroke) is carried out. A compression-stroke injection amount is gradually decreased or increased when the split injection is carried out. Engine rotational speed, which varies by combustion of such injected fuel, is detected for respective fuel injection amounts, which are varied (decreased or increased) as above. Such a fuel injection amount, with which the engine rotational speed becomes maximum, is calculated and set as a basic injection amount for the compression-stroke injection. The fuel injection in the compression stroke is then controlled based on the basic injection amount.

11 Claims, 9 Drawing Sheets

FIRST
CYLINDER

SECOND
CYLINDER

AVERAGE OF T30 (n=20)

COMPRESSION-STROKE INJECTION AMOUNT

STANDARD DEVIATION OF T30 (n=20)

COMPRESSION-STROKE INJECTION AMOUNT

FUEL INJECTION CONTROL SYSTEM FOR DIRECT-INJECTION ENGINE

CROSS REFERENCE TO RELATED APPLICATION

This application is based on Japanese Patent Application No. 2010-164757 filed on Jul. 22, 2010, the disclosure of which is incorporated herein by reference.

FIELD OF THE INVENTION

The present invention relates to a fuel injection control system for a direct-injection engine, in particular to the fuel injection control system for the direct-injection engine in which fuel is injected into cylinders in an intake stroke as well as in a compression stroke.

BACKGROUND OF THE INVENTION

A fuel injection system has been put into practical use, according to which a split fuel injection is carried out, namely fuel injection is carried out in an intake stroke and a compression stroke of a direct-injection engine. Various kinds of technologies have been proposed in order to increase controllability of the fuel injection in the compression stroke of the split fuel injection.

For example, according to a prior art of U.S. Pat. No. 7,069,138 (a direct-injection engine), a minimum injection time for a fuel injection valve is fixed depending on engine operation condition, such as fuel pressure, engine rotational speed and so on, and fuel injection is carried out in a compression stroke of the engine based on such minimum injection time.

According to another prior art, for example, as disclosed in International patent publication No. 2003-527527, a dynamic error of flow rate as well as a static error of the flow rate for a fuel injection valve is calculated based on an error of torque between respective cylinders as well as information of multiple operating points, so that a fuel injection amount is corrected based on such error of the flow rate in order to uniformize the torque among the cylinders. According to such prior art, it is proposed that the fuel injection amount is corrected by taking into consideration not only the static error of the flow rate in a condition of a full valve open of the fuel injection valve but also the dynamic error of the flow rate in a valve opening or in a valve closing operation of the fuel injection valve, so that a stable and homogeneous operation of the engine is obtained either in a stratified combustion mode or in a homogeneous combustion mode.

Fuel injection characteristic for a compression-stroke injection is shown in FIG. 12. An area, in which a fuel injection time is longer than a time "Tx" (which corresponds to a boundary point), is a linear area in which fuel injection amount is increased in proportion to an increase of the fuel injection time. An area, in which the fuel injection time is shorter than the time "Tx", is a non-linear area in which the fuel injection amount varies with respect to the fuel injection time due to various factors, such as, individual differences and secular changes of the fuel injection valve and so on in FIG. 12, characteristics indicated by one-dot-chain lines show a range of variation of the fuel injection characteristic.

When compared the linear area with the non-linear area, the error of the variation for the fuel injection characteristic in the linear area is "E1", while the error of the variation for the fuel injection characteristic in the non-linear area is "E2". And the error "E1" is smaller than the error "E2" (E1<E2). This means that the variation of the fuel injection amount may become larger when the compression-stroke injection (the fuel injection of small amount of fuel) is carried out in the non-linear area. And thereby, the output of the engine as well as emission of exhaust gas may be adversely affected.

According to the above prior art (U.S. Pat. No. 7,069,138), when the compression-stroke injection is carried out in the non-linear area, the combustion stability may be decreased due to the variation of the fuel injection characteristic in the non-linear area, and thereby the emission of the exhaust gas may be adversely affected. In other words, according to this prior art, it may not be possible to absorb the variation of the fuel injection characteristic in the non-linear area, and unstable combustion may not be avoided.

According to the above other prior art (International patent publication No. 2003-527527), although it is possible to absorb the error of the fuel injection characteristic in the linear area (a normally operating area), it may not be possible to absorb the error of the fuel injection characteristic in the non-linear area. In other words, there is no guarantee that the error of the flow rate is treated as such error, which would be changed in a primary relationship with any one of engine operating parameters. As a result, there is a problem that the combustion stability may be decreased, the emission of the exhaust gas may be deteriorated and so on.

SUMMARY OF THE INVENTION

The present invention is made in view of the above problems. It is an object of the present invention to provide a fuel injection control system for a direct-injection engine, according to which control accuracy for fuel injection of a small amount of fuel will be improved.

The present invention is applied to a direct-injection engine, according to which fuel is directly injected into a combustion chamber from a fuel injection valve. A split injection is carried out for the engine, namely the fuel is injected in an intake stroke and a compression stroke of the engine.

According to a feature of the present invention, for example, as defined in the appended claim 1, fuel injection amount in the compression stroke is gradually decreased or increased by an injection-amount changing portion, when the split injection is carried out. A rotational speed of the engine, which is changed by combustion of the injected fuel, is detected by a rotation detecting portion for respective fuel injections an amount of which is increased or decreased by the injection-amount changing portion.

In addition, an amount of the fuel injection, with which the rotational speed of the engine becomes maximum, is calculated by a basic-injection-amount calculating portion and set as a basic injection amount for the fuel injection in the compression stroke. After the basic injection amount has been calculated, the fuel injection for the compression stroke is controlled by an injection controlling portion based on the basic injection amount.

When the split injection is carried out, a small amount of fuel is injected in the compression stroke of the engine (which is referred to as a compression-stroke injection). With such a fuel injection of the small amount, the characteristic of the fuel injection becomes non-linear and thereby it becomes difficult to guarantee accuracy of fuel injection amount by the fuel injection valve.

The inventor of the present invention found out that, when the fuel injection amount is gradually increased or decreased in the compression stroke of the non-linear area, combustion condition is correspondingly changed, and finally a difference appears in the engine rotational speed which is changed by such combustion condition. It is thought that a fuel injection amount, with which an increasing amount of the engine rotational speed in the non-linear area becomes maximum, corresponds to a fuel injection amount (an optimum fuel amount) with which the combustion condition may become optimum in the non-linear area. According to the present invention, the fuel injection amount is changed in several times, and the above optimum fuel amount is one of the several fuel injection amounts. In addition, it is confirmed by the inventor that, with the fuel injection amount (the optimum fuel amount), with which the increasing amount of the engine rotational speed becomes maximum in the non-linear area, the emission of exhaust gas (for example, emission of HC) becomes minimum in the non-linear area and furthermore a stability of fuel combustion becomes maximum.

According to the present invention, as explained above, the fuel injection amount for the compression stroke is gradually decreased or increased and the basic injection amount is calculated based on the fuel injection amount, with which the engine rotational speed (the increasing amount thereof) becomes maximum. As a result, although the small amount of fuel is injected in the non-linear area, it is possible to calculate the basic injection amount with which optimization of the combustion condition can be achieved. When the fuel injection for the compression stroke is controlled based on the above basic injection amount, it becomes possible to carry out a proper fuel injection control, which would not be influenced by individual differences and secular changes of the fuel injection valves. It is, therefore, possible to improve control accuracy for the fuel injection of the small amount of fuel and to realize an improvement in combustion stability and reduction of emission of exhaust gas.

It is preferable to calculate the basic injection amount for each of the cylinders in case of the multi-cylinder engine. Even when the characteristic of the fuel injection valve differs from cylinder to cylinder, it is possible to calculate an appropriate basic injection amount for the respective fuel injection valves.

When calculating an optimum compression-stroke injection amount (that is, the basic injection amount) in the non-linear area, a dispersion which indicates a range of variation of the engine rotational speed may be used as one of parameters for indicating the combustion condition, instead of (or in addition to) the engine rotational speed which varies depending on the combustion condition. When the combustion is carried out with the optimum fuel injection amount in the non-linear area, the combustion condition becomes more stable and thereby the range of the variation of the engine rotational speed becomes smaller. As an index for indicating the dispersion, a standard deviation (a square of difference (deviation) between a datum and an average thereof is calculate, an average value of such square is further calculated, and a square root of the average value is obtained as the standard deviation) or a variance (a value before calculating the square root, that is, a square of the standard deviation) may be used.

According to another feature of the invention, for example, as defined in the claim 2, a dispersion indicating a range of variation of the rotational speed of the engine is calculated by a dispersion calculating portion based on the rotational speed of the engine detected by the rotation detecting portion, during an engine operating period in which the amount of the fuel injection in the compression stroke is set at the same amount to the other fuel injections in the compression stroke. An amount of the fuel injection, with which the rotational speed of the engine detected by the rotation detecting portion becomes maximum, is calculated as a first provisional injection amount. An amount of the fuel injection, with which the dispersion calculated by the dispersion calculating portion becomes minimum, is calculated as a second provisional injection amount. The basic injection amount is then calculated based on the first and second provisional injection amounts.

According to the above feature, since the basic injection amount can be calculated not only based on the engine rotational speed but also based on the dispersion thereof, it is possible to increase the accuracy for calculating the basic injection amount, and thereby to carry out the fuel injection control with higher reliability.

According to a further feature of the invention, for example, as defined in the claim 3, temperature of the engine is detected at starting an operation of the engine. And when the temperature of the engine is lower than a predetermined value, the second provisional injection amount is set as the basic injection amount, while when the temperature of the engine is higher than the predetermined value, the first provisional injection amount is set as the basic injection amount.

When the temperature of the engine (for example, temperature of engine cooling water) is lower than the predetermined value, friction of the engine becomes higher and thereby the variation (the dispersion) of the engine rotational speed becomes larger. Therefore, it is thought that use of the dispersion (such as the standard deviation) may be better than the use of a parameter directly utilizing the engine rotational speed (the average value thereof) in order to grasp the variation of the combustion condition caused by the different amounts of the fuel injection in the compression stroke. Therefore, according to the above feature of the invention, the basic injection amount can be calculated more exactly when the engine temperature is lower than the predetermined value.

The split injection is generally carried out when the engine is started in a cold condition. Therefore, one of temperatures, which belongs to a temperature range of an engine cold-start, may be selected as the above predetermined value. As a result, when the temperature is lower than the predetermined value, it corresponds to such a condition for the engine cold-start and the fuel injection is carried out based on the basic injection amount of the second provisional amount.

According to a still further feature of the invention, for example, as defined in the claim 4, the basic injection amount is memorized by a learning control portion as a learning value in a back-up memory device. When a learning process for the basic injection amount has not yet been carried out by the learning control portion, the first provisional injection amount is set as the basic injection amount, and while when the learning process for the basic injection amount has been carried out by the learning control portion, the second provisional injection amount is set as the basic injection amount.

In a structure, in which the basic injection amount is calculated as the learning value, it is preferable to obtain such learning value as early as possible, in a case that such learning value has not yet been calculated. A certain number of samples for the engine rotational speed are necessary to precisely calculate the dispersion of the engine rotational speed. Therefore, it needs a certain time for such a system in which the dispersion is calculated and then the learning value is calculated based on the dispersion. According to the above feature of the invention, the first provisional injection amount is calculated in the case that the learning value has not yet been obtained, while the second provisional injection amount is calculated in the case that the learning value has been already obtained. It is possible to obtain the learning value at an early stage on one hand (in the case of the learning value not being obtained), and to increase the accuracy of the learning value on the other hand (in the case of the learning value being already obtained).

According to a still further feature of the invention, for example, as defined in the claim 8, the basic injection amount is calculated based on the dispersion indicating the range of the variation of the rotational speed of the engine. Namely, the fuel injection amount, with which the dispersion of the engine rotational speed becomes minimum, is calculated as the basic injection amount.

According to such feature, although the small amount of fuel is injected in the non-linear area, it is possible to calculate the basic injection amount with which optimization of the combustion condition can be achieved. When the fuel injection for the compression stroke is controlled based on the above basic injection amount, it becomes possible to carry out a proper fuel injection control, which would not be influenced by individual differences and secular changes of the fuel injection valves. It is, therefore, possible to improve control accuracy for the fuel injection of the small amount of fuel and to realize an improvement in combustion stability and reduction of emission of exhaust gas.

According to a still further feature of the invention, for example, as defined in the claims 5, 6, 9 and 10, the fuel injection amount control system has a learning control portion for memorizing the basic injection amount as a learning value in a back-up memory device. According to the feature of the invention (the claims 5 and 9), fuel pressure of the fuel to be injected from the fuel injection valve is detected. The fuel pressure is divided into multiple fuel pressure ranges, and the learning process for the basic injection amount is carried out for the respective fuel pressure ranges. According to the further feature of the invention (the claims 6 and 10), a cylinder pressure corresponding to a pressure in a combustion chamber of the engine is detected. The cylinder pressure is divided into multiple cylinder pressure ranges, and the learning process for the basic injection amount is carried out for the respective cylinder pressure ranges.

When the fuel pressure is changed, the characteristic of the fuel injection valve is correspondingly changed. In this case, in the non-linear area of the fuel injection characteristic, the fuel injection amount is not changed in a primary relationship with the change of the fuel pressure. When the learning process for the basic injection amount is carried out for the respective fuel pressure ranges, it is possible to properly carryout the compression-stroke injection (that is, the fuel injection of the small amount) based on the learning values, even if the fuel pressure is changed.

Similarly, when the cylinder pressure is changed, the characteristic of the fuel injection valve is correspondingly changed. In the non-linear area of the fuel injection characteristic of this case, the fuel injection amount is not changed in a primary relationship with the change of the cylinder pressure. Therefore, when the learning process for the basic injection amount is carried out for the respective cylinder pressure ranges, it is possible to properly carry out the compression-stroke injection (that is, the fuel injection of the small amount) based on the learning values, even if the cylinder pressure is changed. It is possible not only to detect the cylinder pressure by a cylinder pressure sensor but also to estimate the cylinder pressure based on the operating condition of the engine, such as the engine rotational speed, the engine load and so on.

According to a still further feature of the invention, for example, as defined in the claim 7 or 11, the rotational speed of the engine is detected at such a rotation detecting position for respective cylinders, which corresponds to an angular position of an engine crankshaft after a combustion in each of the cylinder, and the rotation detecting position is changed depending on an operating condition of the engine.

According to the invention, the fuel injection amount is gradually changed for the compression-stroke injection, so that the basic injection amount is calculated based on the difference in the changing portion of the engine rotational speed caused by such change of the fuel injection amount. It is, therefore, desirable to get data reflecting more exactly the combustion condition as a parameter for the engine rotational speed. When it is possible to change the rotation detecting position depending on the operating condition of the engine, the rotation detecting position can be moved to a proper position even if a peak position for the engine rotational speed is changed for each of the cylinders depending on the change of the operating condition of the engine. As a result, it is possible to obtain the engine rotational speed reflecting more exactly the combustion condition, to thereby increase the reliability of the basic injection amount.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be explained by way of an embodiment with reference to the drawings. The embodiment shows an engine control system for a direct-injection engine for a vehicle, an outline of which is shown in FIG. 1.

Figure 1:
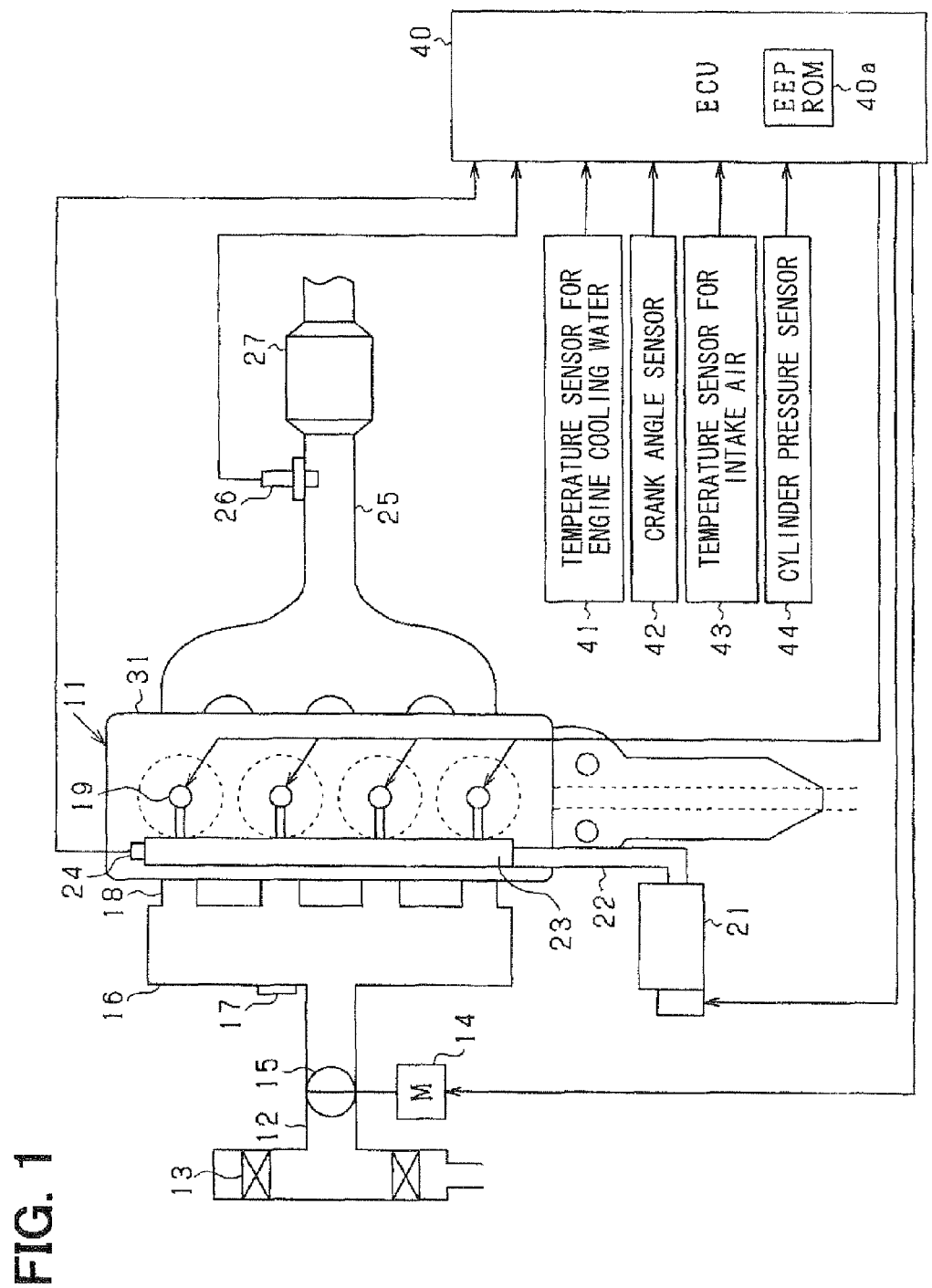
FIG. 1 is a schematic view showing a structure of a fuel injection control system for an engine according to an embodiment of the present invention.

In FIG. 1, an engine 11 is a four-cylinder engine having an air intake pipe 12. An air cleaner 13 is provided at an upstream end of the air intake pipe 12. A throttle valve 15, an opening degree of which is controlled by an electric motor 14, is provided in the air intake pipe at a downstream side of the air cleaner 13. A surge tank 16 is provided at a downstream side of the throttle valve 15 and a pressure sensor 17 is provided at the surge tank 16 for detecting intake air pressure in the intake pipe 12. In addition, an intake manifold 18 is provided at the surge tank 16, so that the intake air is supplied into respective cylinders of the engine 11.

Fuel injection valves 19 are provided in a cylinder head 31 of the engine 11 at respective cylinders so that fuel is directly injected into the cylinders. Fuel from a high pressure pump 21 is supplied to a fuel delivery pipe 23 through a high pressure fuel pipe 22. The high pressure fuel is distributed from the fuel delivery pipe 23 to the respective fuel injection valves 19. A fuel pressure sensor 24 is provided at the fuel delivery pipe 23 so as to detect the fuel pressure to be supplied to the fuel injection valves 19.

Figure 2:
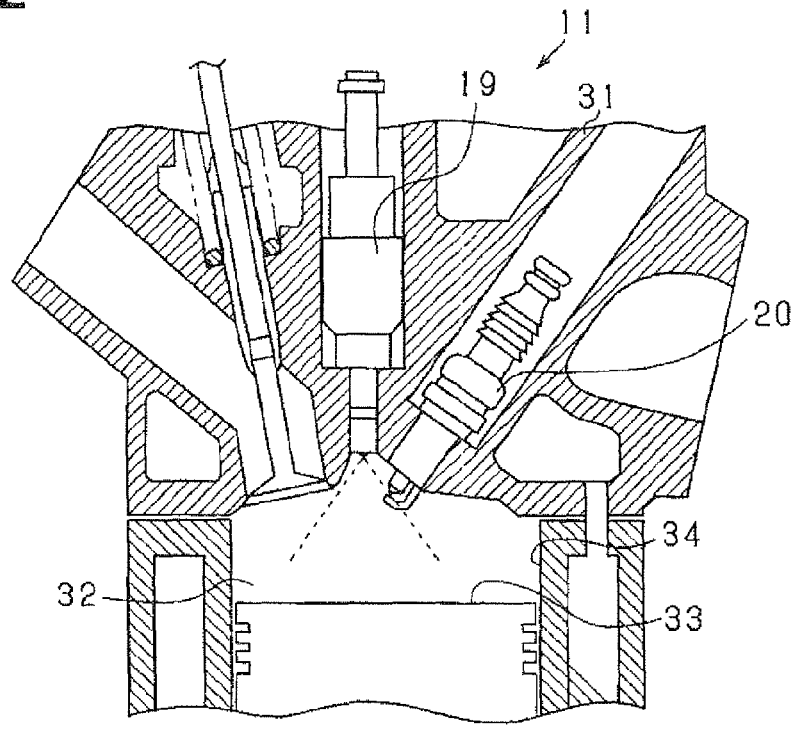
FIG. 2 is a schematic cross sectional view showing a portion of a structure for a combustion chamber of the engine.

As shown in FIG. 2, ignition plugs 20 are provided in the cylinder head 31 of the engine 11 at the respective cylinders. Air-fuel mixture in the cylinder is ignited by spark discharge at the ignition plug 20. The engine 11 is a cylinder-injection (direct-injection) type engine of a center injection. Each of the fuel injection valves 19 is provided above a combustion chamber 32 at almost a center thereof (adjacent to the ignition plug 20). The fuel injection valve 19 injects the fuel into the combustion chamber 32 in a downward direction, namely toward a top surface 33 of a piston. Fuel injection force (penetration force) is set at such a low value, that the fuel injected from the fuel injection valve 19 may not collide with the top surface 33 of the piston and an inner wall 34 of the cylinder. As a result, amount of the fuel adhered to the top surface 33 of the piston or the inner wall 34 of the cylinder may be decreased.

As shown in FIG. 1, an exhaust gas sensor 26 (an air-fuel ratio sensor, an oxygen sensor, and so on) is provided in an exhaust pipe 25 of the engine 11 in order to detect air-fuel ratio or rich/lean of the exhaust gas. A catalyst 27 is also provided in the exhaust pipe 25 for purifying the exhaust gas.

A temperature sensor 41 for detecting temperature of engine cooling water as well as a crank angle sensor 42 for outputting rotation detecting signals (NE pulse signals, etc.) for each crank angle rotation (for example, 6° CA) of a crank shaft is provided in a cylinder block of the engine 11. A crank angle position as well as engine rotational speed (including engine angular speed) is detected based on the rotation detecting signals from the crank angel sensor 42. Temperature of the intake air is detected by a temperature sensor 43 for the intake air. Pressure (cylinder pressure) in the combustion chamber 32 is detected by a cylinder pressure sensor 44.

The outputs from those sensors are inputted to an engine control unit (ECU) 40. The ECU 40 is mainly composed of a micro computer, according to which various engine control programs memorized in a memory device (for example, ROM) are carried out in order to control fuel injection amount from the injection valves 19 as well as ignition timing by the ignition plugs 20 depending on operating condition of the engine. EEPROM 40a is provided in the ECU 40 as a back-up memory device for memorizing various learning values, data of failure diagnosis and so on.

According to the fuel injection control carried out by the ECU 40, the fuel injection is carried out in an intake stroke (the intake-stroke injection) and/or in a compression stroke (the compression-stroke injection), wherein either one of the intake-stroke injection and the compression-stroke injection is selected depending on the engine operating condition, such as the engine rotational speed, engine load and so on. An operation mode for the intake-stroke injection is referred to as a homogeneous combustion mode, while an operation mode for the compression-stroke injection is referred to as a stratified combustion mode. In the operation mode for the compression-stroke injection (the stratified combustion mode), a relatively small amount of fuel is directly injected into the cylinder during the compression stroke so as to form a stratified mixture adjacent to the ignition plug 20, to thereby carry out a stratified combustion in order to improve fuel consumption ratio. On the other hand, in the operation mode for the intake-stroke injection (the homogeneous combustion mode), an increased amount of the fuel is directly injected into the cylinder during the intake stroke so as to form homogeneous mixture, to thereby carry out a homogeneous combustion to increase engine output.

Figure 3:
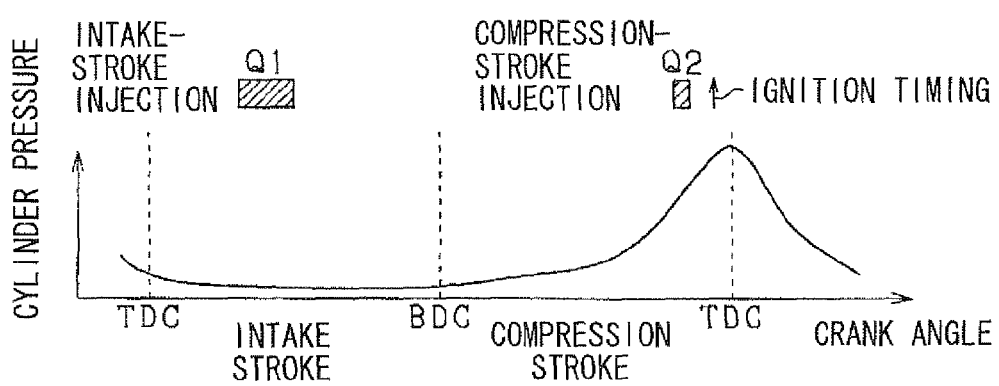
FIG. 3 is a time chart for explaining split fuel injection.

In addition, at a cold start of the engine 11, a split fuel injection is carried out, according to which the fuel injection is divided into the injections in the intake stroke and the compression stroke. The intake-stroke injection and the compression-stroke injection are carried out based on a division ratio, which is decided depending on the engine operating condition. More exactly, as shown in FIG. 3, the intake-stroke injection is carried out in the intake stroke, while the compression-stroke injection is carried out in the compression stroke. In this operation, an amount of the fuel necessary for one combustion is divided into two portions, namely the fuel amount Q1 for the intake-stroke injection and the fuel amount Q2 for the compression-stroke injection. When compared the fuel amounts Q1 and Q2, Q1 is larger than Q2 (Q1>Q2). In other words, the fuel amount Q2 for the compression-stroke injection is a smaller amount of the fuel. Injection start timing for the intake-stroke injection is set at, for example, BTDC 300° CA, while injection start timing for the compression-stroke injection is set at a variable timing, which is decided depending on the engine operating condition (the engine rotational speed and the engine load) and ignition timing.

Figure 4A:
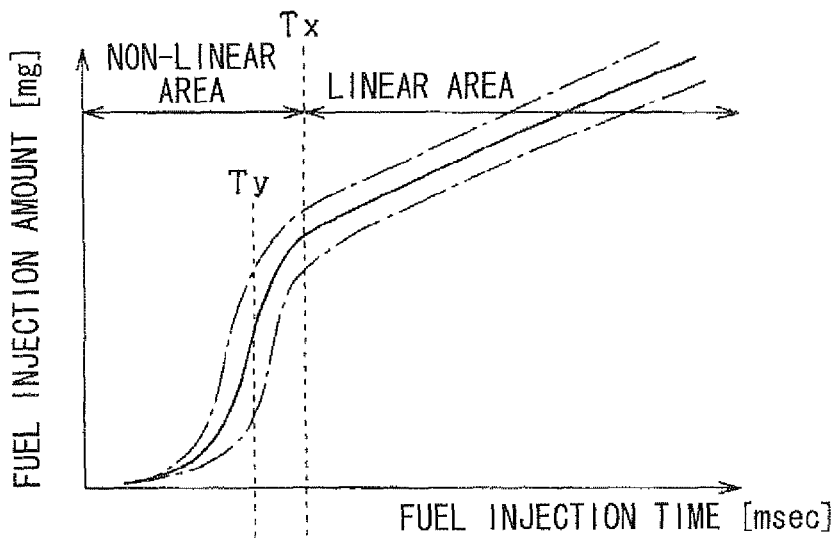
FIGS. 4A to 4C are graphs showing characteristics of the fuel injection in a compression stroke.
Figure 4B:
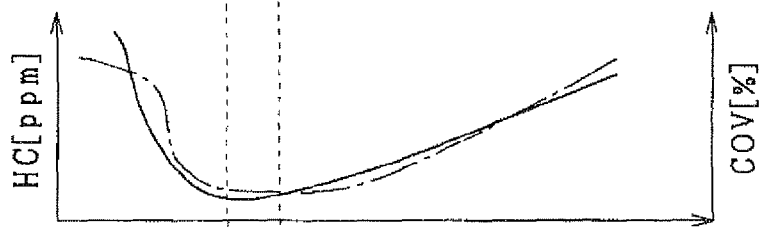
Figure 4C:
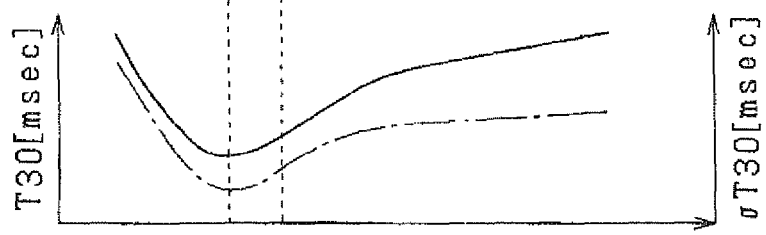

Fuel injection characteristic of the compression-stroke injection is shown in FIG. 4A. In FIG. 4A, fuel injection time Tx is a boundary point. An area, in which time duration is longer than Tx, corresponds to a linear area in which the fuel injection amount is linearly increased with respect to the fuel injection time. An area, in which the time duration is shorter than Tx, corresponds to a non-linear area in which the fuel injection amount varies with respect to the fuel injection time depending on various factors, such as individual differences of the fuel injection valves 19, secular changes thereof, and so on. In FIG. 4A, a horizontal axis indicates the fuel injection time, which corresponds to a duration for power supply to the fuel injection valve 19, while a vertical axis indicates the fuel injection amount injected from the fuel injection valve 19 as a result of the valve open thereof. In FIGS. 4A to 4C, one-dot-chain lines show a range of variation of the fuel injection characteristics.

Since it is generally not possible to guarantee accuracy of the fuel injection valve 19 in the non-linear area, the fuel injection belonging to the non-linear area is not carried out for the compression-stroke injection. The fuel injection belonging to the linear area is generally carried out for the compression-stroke injection. In this meaning, the fuel injection time Tx can be regarded as a minimum fuel injection time for the fuel injection belonging to a normally-used area, which is carried out by the fuel injection valve 19.

According to the present embodiment, however, the compression-stroke injection is carried out by using the non-linear area, in which the fuel injection amount will become smaller than that in the normally-used area (that is, the linear area), namely in which the fuel injection time will become shorter. For that purpose, an optimum fuel amount "QL" for small-amount injection is calculated for respective cylinders as a reference (basic) injection amount in the non-linear area and such optimum fuel amount "QL" for the small-amount injection is memorized as a learning value, so that controllability for the compression-stroke injection can be increased.

In particular, in a case that the engine of the center injection type is used as in the present embodiment, the fuel amount (wet fuel amount) which would be adhered to the top surface 33 of the piston or the inner wall 34 of the cylinder is decreased. Therefore, the required injection amount for the compression-stroke injection may become excessively small. In such a case, the fuel injection of the small amount of the fuel using the non-linear area may be required for the compression-stroke injection.

The inventor of the present invention found out that, when the fuel injection amount is gradually increased or decreased for the compression-stroke injection in the non-linear area, combustion condition in the respective cylinders is correspondingly changed, and finally a difference appears in an increasing portion of the engine rotational speed (an increasing amount of the rotation for the respective cylinders). The fuel injection amount in the non-linear area, with which the increasing amount of the engine rotational speed becomes maximum, can be regarded as such a fuel injection amount with which the combustion condition may become optimum in the non-linear area.

This will be further explained with reference to FIGS. 4A to 4C. In FIG. 4B, in which a horizontal axis indicates a fuel injection time for the compression-stroke injection, amount of HC emission is indicated by a solid line, while a combustion stability index "COV" which is an index representing combustion stability is indicated by a one-dot-chain line. In FIG. 4C, in which a horizontal axis also indicates the fuel injection time for the compression-stroke injection, a pulse interval "T30" is indicated by a solid line, while a standard deviation "σT30" for the pulse interval "T30" is indicated by a one-dot-chain line. Data for FIGS. 4B and 4C are obtained by measuring the above amount of HC emission, the pulse interval "T30" and so on under a condition that a total amount of the fuel injection for the split injection is maintained at a constant value, while the division ratio is changed to various values, namely the fuel injection time for the compression-stroke injection (that is, the fuel injection amount) is changed to various values.

The combustion stability can be expressed, for example, by a misfire ratio of the engine. Therefore, when the combustion stability is high, combustion variation is small and misfire hardly occurs. In the present embodiment, the combustion stability index "COV" (Coefficient of Variation) is used as a parameter indicating the combustion stability. The combustion stability index "COV" is an index indicating a range from a lowest stability (that is, the misfire) to a highest stability (that is, a complete combustion). Therefore, when the index value is smaller, the combustion stability becomes higher.

The pulse interval "T30" indicates a necessary time for the engine crank shaft, which is rotated for 30° CA. The pulse interval "T30" is calculated by a time duration between NE pulses, which are separated by 30° CA. The pulse interval "T30" is an inverse number of the engine angular speed. Therefore, the pulse interval becomes smaller, as the engine angular speed is increased. In the present embodiment, the pulse interval "T30" is used as a parameter, which indicates the engine rotational speed corresponding to an increased amount of the speed realized by the combustion in the respective cylinders.

As shown in FIGS. 4B and 4C, at a fuel injection time "Ty" at which the pulse interval "T30" becomes minimum in the non-linear area (the time "Ty" corresponds to the fuel injection amount for which the increased amount of the engine rotational speed becomes maximum), the standard deviation "σT30" becomes minimum. In addition, the amount of HC emission as well as the combustion stability index "COV" becomes minimum. In other words, it is understood that there exists such a fuel injection time in the area of small amount of fuel injection, at which all of the pulse interval "T30", the standard deviation "σT30", the amount of HC emission and the combustion stability index "COV" become optimum. According to the present embodiment, this fact is effectively used, so that the optimum fuel amount "QL" for the small-amount injection (i.e. the basic injection amount) in the non-linear area is calculated and thereby the fuel injection for the compression-stroke injection is carried out by use of the optimum fuel amount "QL" for the small-amount injection.

In particular, in case of the center injection type engine, it is thought that an area in which the combustion condition of the engine 11 becomes optimum, namely an area in which the amount of HC emission becomes minimum and the combustion stability of the engine is not deteriorated, can belong to the non-linear area.

Figure 5A:
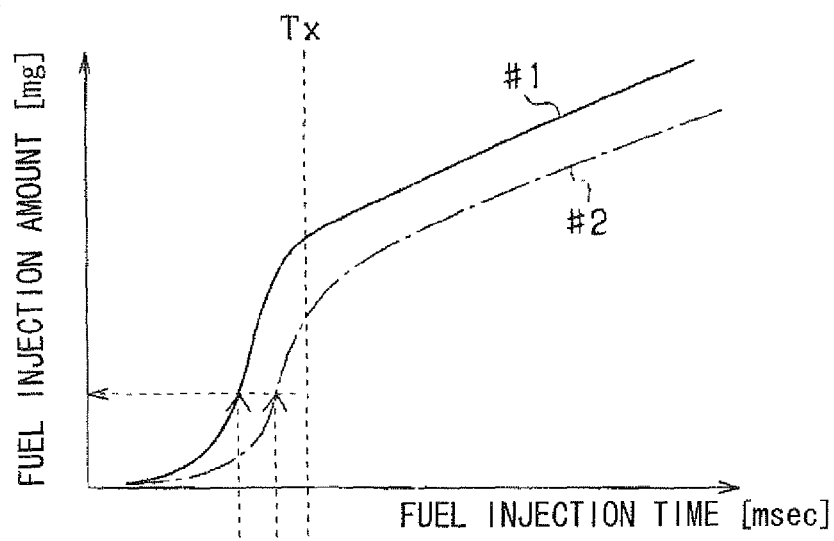
FIGS. 5A to 5C are also graphs showing characteristics of the fuel injection in the compression stroke.
Figure 5B:
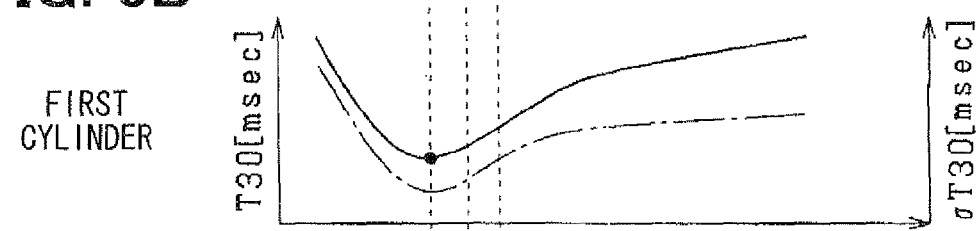
Figure 5C:
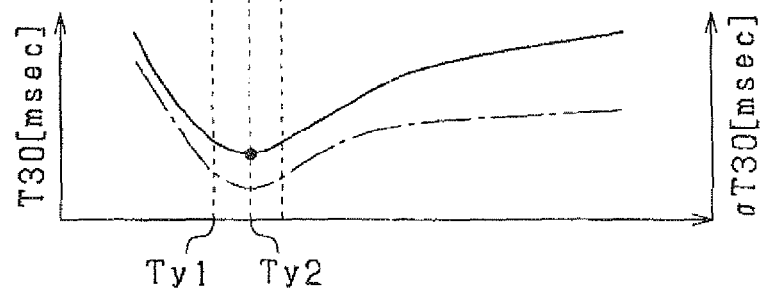

In a case of the multi-cylinder engine, the characteristic of the fuel injection valve 19 may differ from the cylinder to cylinder. More exactly, as shown in FIGS. 5A to 5C, the fuel injection time at which the pulse interval "T30" becomes minimum is at "Ty1" for a first cylinder (#1), while the fuel injection time at which the pulse interval "T30" becomes minimum may becomes at "Ty2" for a second cylinder (#2). According to the present embodiment, the optimum fuel amount "QL" for the small-amount injection is calculated (learned) for the respective cylinders.

Figure 6:
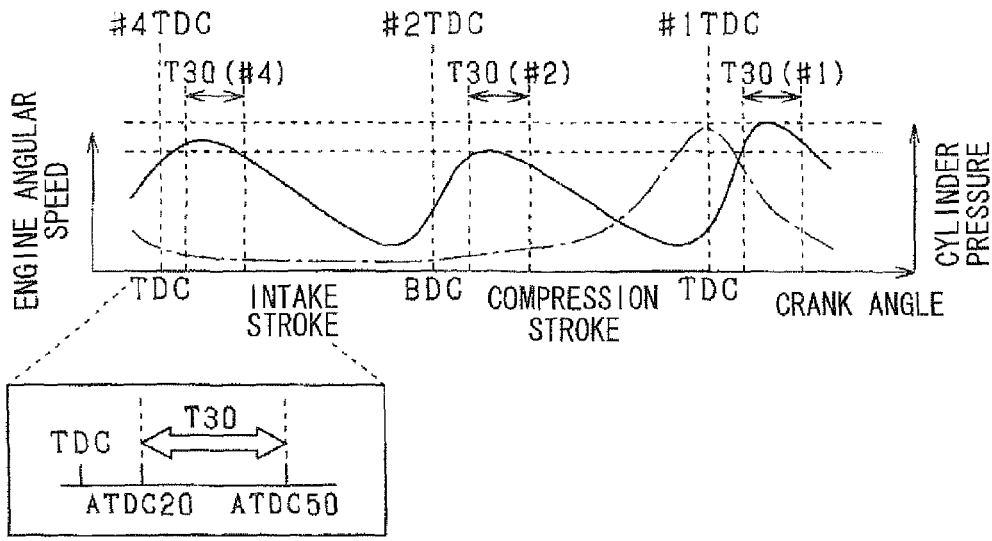
FIG. 6 is a time chart for showing transition of angular speed of the engine during an engine operation.

FIG. 6 is a time chart showing transition of the engine angular speed during the engine operation. In FIG. 6, the transition of the engine angular speed is indicated by a solid line, while transition of cylinder pressure for the first cylinder (#1) is indicated by a one-dot-chain line.

In FIG. 6, a combustion order of the engine 11 is the first cylinder (#1), a third cylinder (#3), a fourth cylinder (#4) and the second cylinder (#2). The engine angular speed is increased adjacent to TDC (a top dead center) of the respective cylinders. When calculating the pulse interval "T30", NE pulse signals, which are outputted at a cycle of 6° CA, are used. The pulse interval "T30" is calculated as a time necessary for the engine crank shaft, which is rotated by 30° CA. In the present embodiment, an angular range between ATDC 20° CA and ATDC 50° CA is set as a detection range for the pulse interval "T30". The time necessary for such detection range is calculated as the pulse interval "T30". Since a peak value of the engine angular speed differs from cylinder to cylinder, the pulse interval "T30" is calculated for the respective cylinders.

According to the present embodiment, since the NE pulse signals are outputted for each 6° CA, 6° CA is a minimum limit of resolution. The detection range for the pulse interval "T30" can be changed to an advancing side or to a retarding side.

Figure 7A:
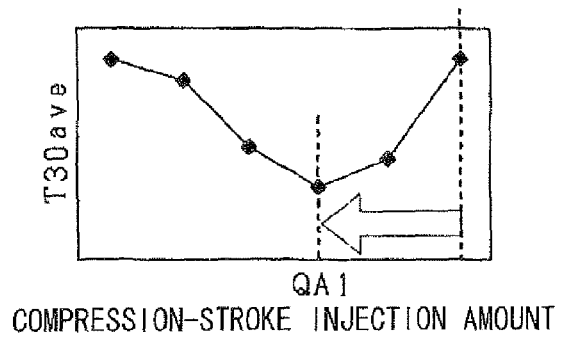
FIGS. 7A and 7B are graphs respectively showing a relationship between an average value (T30ave) and fuel injection amount in the compression stroke and a relationship between a standard deviation ($\sigma$T30) and the fuel injection amount in the compression stroke.
Figure 7B:
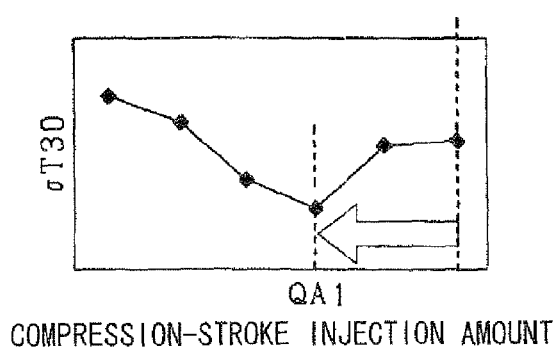

FIGS. 7A and 7B, respectively, show changes of the pulse interval "T30" for each injection and changes of the standard deviation "σT30" thereof, when the fuel injection amount for the compression-stroke injection is changed to a smaller value in the non-linear area. FIG. 7A shows a relationship between the fuel injection amount of the compression-stroke injection and an average value "T30ave" of the pulse interval "T30", while FIG. 7B shows a relationship between the fuel injection amount of the compression-stroke injection and the standard deviation "σT30".

In FIG. 7A, the average values "T30ave" of the pulse interval "T30" calculated for each injection amount are plotted, when the fuel injection amount for the compression-stroke injection is changed to the smaller value by a predetermined amount. In a similar manner, in FIG. 7B, the standard deviations "σT30" of the pulse interval "T30" calculated for each injection amount are plotted, when the fuel injection amount for the compression-stroke injection is changed to the smaller value by the predetermined amount. A number of samples for the pulse interval "T30" is, for example, 20 (n=20).

In FIGS. 7A and 7B, the average value "T30ave" of the pulse interval "T30" as well as the standard deviation "σT30" becomes minimum, when the fuel injection amount for the compression-stroke injection is "QA1". The amount of "QA1" corresponds to the optimum fuel amount "QL" for the small-amount injection, in the case that the small amount of the fuel is injected.

An operation for the fuel injection at the cold-start of the engine 11 or at warm-up of the catalyst will be explained with reference to time charts.

Figure 8:
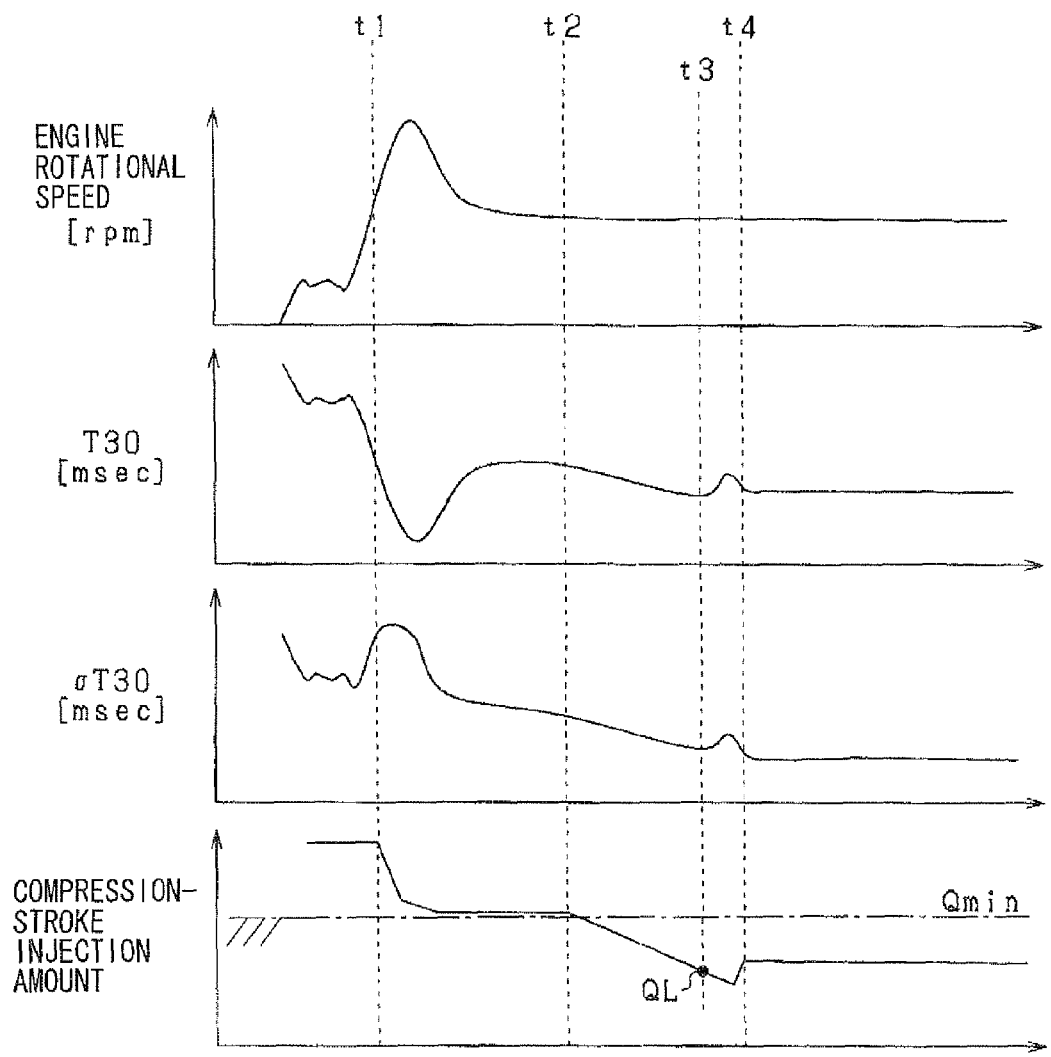
FIG. 8 is a time chart for explaining an operation of the engine during cold-start.

FIG. 8 is a time chart showing transitions of the engine rotational speed, the pulse interval "T30", the standard deviation "σT30" and the fuel injection amount for the compression-stroke injection at the cold-start of the engine 11.

In FIG. 8, when a cranking operation for the engine 11 starts, the engine rotational speed is increased in accordance with start of the combustion in the engine 11. In a stage of starting the engine operation, the fuel injection is carried out for the respective cylinders only in the compression stroke, but after a timing t1, the split injection is carried out. Namely, since the fuel injection is carried out not only in the compression stroke but also in the intake stroke after the timing t1, the fuel injection amount for the compression-stroke injection becomes smaller than that before the timing t1.

A period between the timings t1 and t2 is a stabilization period for achieving stabilization of the engine rotation after the start of the engine operation. In the drawing, "Qmin" is a minimum fuel injection amount in the linear area for the characteristic of the fuel injection and corresponds to the fuel injection amount obtained by the fuel injection time "Tx" shown in FIG. 4A. During the stabilization period (between t1 and t2), the compression-stroke injection is carried, in which the fuel injection amount is equal to the minimum fuel injection amount "Qmin" in the linear area or such an amount which is slightly larger than the minimum fuel injection amount "Qmin" in the linear area.

A subsequent period between timing t2 and t4 is a learning control period, in which a learning control for the optimum fuel amount "QL" for the small-amount injection is carried out. During the learning control period (between t2 and t4), the fuel injection amount for the compression-stroke injection is gradually changed to a smaller value. In a course of such operation, the fuel injection amount for the compression-stroke injection, for which the pulse interval "T30" becomes minimum, is learned as the optimum fuel amount "QL" for the small-amount injection. In FIG. 8, the fuel injection amount at the timing t3 is learned as the optimum fuel amount "QL" for the small-amount injection.

After the timing t4, the compression-stroke injection is continuously carried out based on the optimum fuel amount "QL" for the small-amount injection, which has been learned as above. In the present embodiment, the optimum fuel amount "QL" for the small-amount injection is used as a minimum guard amount for the fuel injection amount of the compression-stroke injection. More exactly, a total fuel injection amount is calculated at first for each combustion cycle based on the current engine operating condition, and then the fuel injection amount for the compression-stroke injection is calculated based on such total fuel injection amount and the current division ratio. The division ratio is decided based on the engine rational speed, the engine load, an elapsed time from the engine start point. Such calculated fuel injection amount for the compression-stroke injection is compared with the optimum fuel amount "QL" for the small-amount injection. When the fuel injection amount for the compression-stroke injection is smaller than the optimum fuel amount "QL" for the small-amount injection, the fuel injection amount for the compression-stroke injection is guarded by the optimum fuel amount "QL" for the small-amount injection (namely, the fuel injection amount for the compression-stroke injection is decided as such a value equal to the optimum fuel amount "QL" for the small-amount injection). Alternatively, when the compression-stroke injection is carried out, the fuel injection amount for the compression-stroke injection may be always set at a value equal to the optimum fuel amount "QL" for the small-amount injection.

Figure 9:
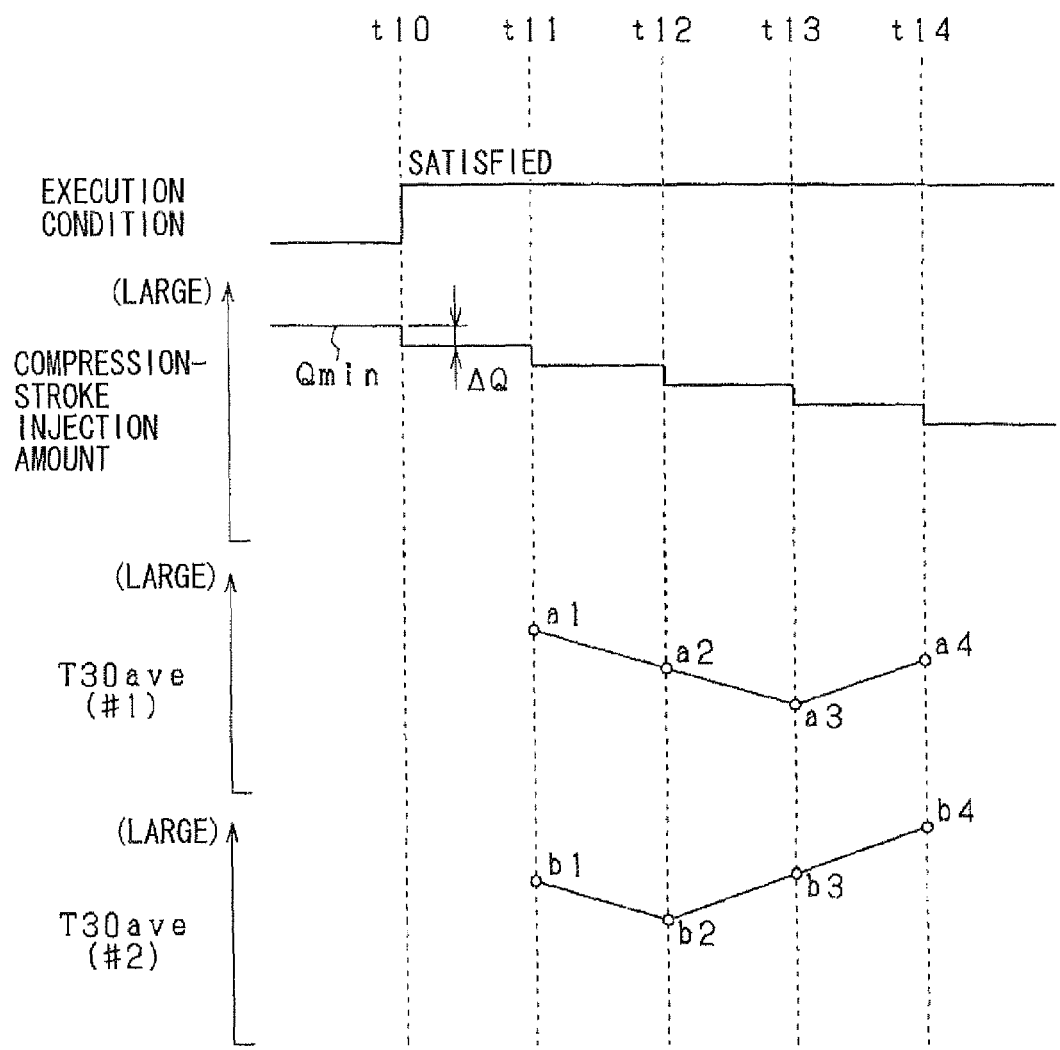
FIG. 9 is a time chart for showing a learning control for an optimum fuel amount for a small-amount injection.

FIG. 9 is a time chart showing the learning control for the optimum fuel amount "QL" for the small-amount injection. For the purpose of simplified explanation, transitions of average values "T30ave" of the pulse intervals "T30" are indicated only for the first and second cylinders of the engine.

In FIG. 9, when an execution condition for starting the learning control is satisfied at a timing t10, the learning control is started. At first, a value of "Qmin (the minimum fuel injection amount in the linear area) −ΔQ" is set as an initial value for the compression-stroke injection amount at the start of the learning control. The compression-stroke injection is carried out with the fuel injection amount of "Qmin−ΔQ". "ΔQ" is a varying amount, so that the compression-stroke injection amount is stepwise changed to the smaller value by such varying amount. In the present embodiment, the varying amount of "ΔQ" is set at a fixed value. When the compression-stroke injection amount is decreased, the intake-stroke injection amount is correspondingly increased by such decreased amount. Namely, the total fuel injection amount for each combustion is maintained at the constant value.

A period between the timings t10 and t11 is an engine operating period, during which the compression-stroke injection of "Qmin−ΔQ" is carried out. During the period (t10-t11), a predetermined number of samples for the pulse intervals "T30" are taken for the respective cylinders. At the timing t11, at which the predetermined number of samples has been taken, the average value "T30ave" of the pulse intervals "T30" as well as the standard deviation "σT30" is calculated for the respective cylinders. In FIG. 9, the average value "T30ave" for the first cylinder is calculated as a value "a1", while the average value "T30ave" for the second cylinder is calculated as a value "b1".

In addition, at the timing t11, the compression-stroke injection amount is further decreased by the varying amount "ΔQ". A period between the timings t11 and t12 is an engine operating period, during which the compression-stroke injection of "Qmin−2ΔQ" is carried out. In the same manner to the period of t10 to t11, a predetermined number of samples for the pulse intervals "T30" are taken for the respective cylinders. At the timing t12, at which the predetermined number of samples has been taken, the average value "T30ave" of the pulse intervals "130" as well as the standard deviation "σT30" is calculated for the respective cylinders. In FIG. 9, the average value "T30ave" for the first cylinder is calculated as a value "a2", while the average value "T30ave" for the second cylinder is calculated as a value "b2".

During periods of between t12 and t13 and between t13 and t14, the compression-stroke injection amount is gradually (stepwise) decreased to the smaller value by the varying amount "ΔQ". In the same manner to the above periods, a predetermined number of samples for the pulse intervals "T30" are taken for the respective cylinders, and at the timings t13 and t14, the average value "T30ave" of the pulse intervals "T30" as well as the standard deviation "σT30" is calculated. At the timing t13, the average value "T30ave" for the first cylinder is calculated as a value "a3", while the average value "T30ave" for the second cylinder is calculated as a value "b3". At the timing t14, the average value "T30ave" for the first cylinder is calculated as a value "a4", while the average value "T30ave" for the second cylinder is calculated as a value "b4".

In the case of the average value "T30ave" for the first cylinder, the average value "T30ave" at the timing t13 becomes minimum "a3", while in the case of the average value "T30ave" for the second cylinder, the average value "T30ave" at the timing t12 becomes minimum "b2". In addition, in the case of the average value "T30ave" for the first cylinder, the value "a4" at the timing t14 has become larger than that "a3" of the previous timing t13. Therefore, the value "a3" at the timing t13 can be decided as the minimum value. In a similar manner, in the case of the average value "T30ave" for the second cylinder, the value "b3" at the timing t13 has become larger than that "b2" of the previous timing t12. Therefore, the value "b2" at the timing t12 can be decided as the minimum value.

In the above example, the compression-stroke injection amount for the first cylinder during the period of the timings t12 to t13, during which the samples for the pulse intervals "T30" are taken for the purpose of calculating the average value "a3", can be regarded as such fuel injection amount with which the combustion condition can be improved at best. The compression-stroke injection amount "Qmin−3ΔQ" during the period of the timing t12 to t13 is calculated as the optimum fuel amount "QL" for the small-amount injection. And such optimum fuel amount "QL" for the small-amount injection is memorized in EEPROM 40a as a first learning value. Now, for the second cylinder, the compression-stroke injection amount during the period of the timings t11 to t12, during which the samples for the pulse intervals "T30" are taken for the purpose of calculating the average value "b2", can be likewise regarded as such fuel injection amount with which the combustion condition can be improved at best. The compression-stroke injection amount "Qmin−2ΔQ" during the period of the timing t11 to t12 is calculated as the optimum fuel amount "QL" for the small-amount injection. And such optimum fuel amount "QL" for the small-amount injection is memorized in the EEPROM 40a as a second learning value.

Figure 10:
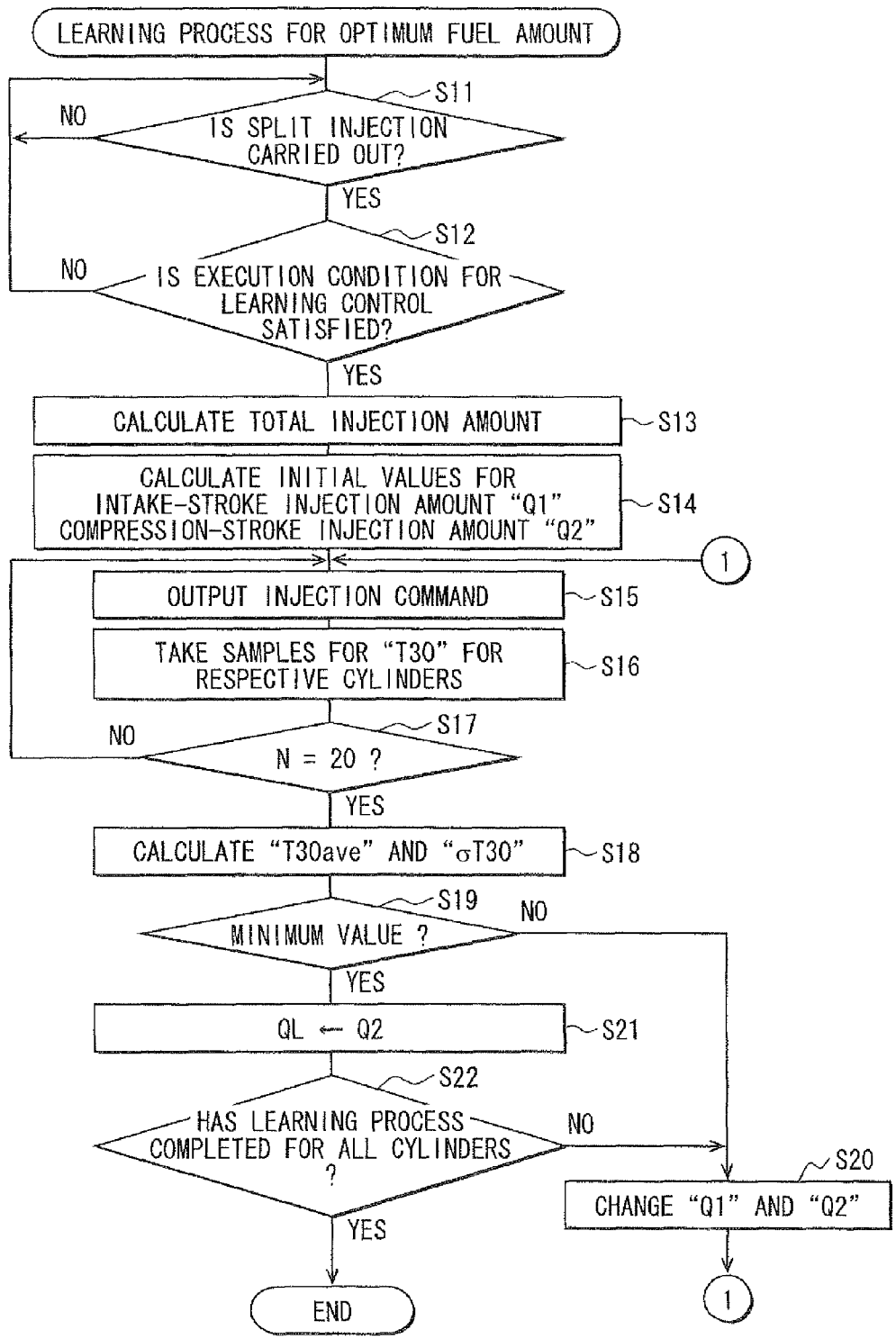
FIG. 10 is a flow chart for the learning control for the optimum fuel amount for the small-amount injection.

FIG. 10 is a flow chart showing a process of the learning control for the optimum fuel amount "QL" for the small-amount injection, which is carried out by the ECU 40. The learning control process starts when an ignition switch is turned on and electric power is thereby supplied to the ECU 40.

In FIG. 10, the ECU 40 determines at a step S11 whether an execution condition for the split injection is satisfied or not. The execution condition for the split injection is regarded as being satisfied in the present embodiment when it is in the cold-start operation of the engine 11 and it is in an operation for warming-up the catalyst 27. More exactly, a period during which temperature of engine cooling water is lower than a predetermined value (for example, lower than 30° C.) and during which temperature of the catalyst 27 is lower than a predetermined activated temperature after the start of the engine operation is set as such a split injection period for which the execution condition is satisfied.

At a step S12, the ECU 40 determines whether an execution condition for the learning control for the optimum fuel amount "QL" for the small-amount injection is satisfied or not. When the engine rotational speed is stable, the condition for starting the learning control for the optimum fuel amount "QL" for the small-amount injection is regarded as being satisfied. More exactly, when variation of the engine rotational speed is within a predetermined range, the condition for starting the learning control is regarded as being satisfied. When the determinations at the steps S11 and S12 are both "YES", the process goes to a subsequent step S13.

At the step S13, the ECU 40 calculates the total fuel injection amount for each combustion cycle based on the current engine operating condition (for example, the engine rotational speed, the engine load and so on). At a subsequent step S14, the ECU 40 respectively calculates initial values for the intake-stroke injection amount "Q1" and the compression-stroke injection amount "Q2" for the purpose of carrying out the learning control. More exactly, the value of "Qmin−ΔQ", which is obtained by subtracting the predetermined varying amount "ΔQ" from the minimum fuel injection amount "Qmin" in the linear area, is set as the initial value for the compression-stroke injection amount "Q2", while the value, which is obtained by subtracting the compression-stroke injection amount "Q2" from the total fuel injection amount, is set as the initial value for the intake-stroke injection amount "Q1".

At a subsequent step S15, the ECU 40 produces fuel injection command signals based on the injection amounts "Q1" and "Q2" calculated at the step S14 (or at a step S20, explained below) and outputs such command signals to the respective cylinders. As a result, the fuel injection valves 19 are operated at proper timings to carry out the fuel injection to the respective cylinders.

At a step S16, the ECU 40 calculates the pulse intervals "T30" in the predetermined detection range for the respective cylinders. At a step S17, the ECU 40 determines whether the number of samples "n" of the pulse intervals "T30" for the respective cylinders has reached at the predetermined number (20 in the present embodiment) or not. In a case of NO at the determination of the step S17, the process goes back to the step S15. In a case of YES, the process goes to a step S18. When the determination at the step S17 is NO, the pulse intervals "T30" are repeatedly calculated for the respective cylinders, while the compression-stroke injection amount "Q2" is maintained at the constant value.

At the step S18, the ECU 40 calculates not only the average values "T30ave" of the pulse intervals "T30" for the respective cylinders, but also the standard deviation "σT30". The standard deviation "σT30" is calculated in such a way that a difference (deviation) between sampled values for the pulse intervals "T30" and the average value "T30ave" is multiplied by the same figure. In other words, a square of the difference is calculated. Then, an average value of such multiplied values (the square) is calculated. And a square root of such average value is calculated to finally obtain the above standard deviation.

At a step S19, the ECU 40 determines whether the data calculated so far for the average values "T30ave" of the pulse intervals "T30" include a minimum data in the non-linear area. In the similar manner, the ECU 40 determines whether the data calculated so far for the standard deviation "σT30" include a minimum data in the non-linear area. More exactly, the current value is compared with the previous value, and the previous value is regarded as the minimum value when the current value is larger than the previous value.

The ECU 40 may determine the minimum values for both of the average value "T30ave" and the standard deviation "σT30" in the above manner. Alternatively, the ECU 40 may determine the minimum value for either one of the average value "T30ave" and the standard deviation "σT30". In a case that the ECU 40 determines the minimum values for both of the average value "T30ave" and the standard deviation "σT30", a correct learning process may be regarded as having been done when a determination result for the average value "T30ave" and a determination result for the standard deviation "σT30" become equal to each other (in other words, when the optimum fuel amount "QL" for the small-amount injection is equal to the compression-stroke injection amount "Q2"). When the determination at the step S19 is NO, the process goes to a step S20, while the process goes to a step S21 in case of YES at the step S19.

When the process goes to the step S20, the fuel injection amounts "Q1" and "Q2" are respectively changed to new values and then the process goes back to the step S15. More exactly, the varying amount "ΔQ" is added to the current intake-stroke injection amount "Q1" on one hand, while the varying amount "ΔQ" is subtracted from the compression-stroke injection amount "Q2" on the other hand. As a result, the fuel injection of the compression-stroke injection amount "Q2" is carried out, wherein the current compression-stroke injection amount "Q2" is smaller than the previous amount. And then, the samples for the pulse intervals "T30" are taken once again.

At the step S21, the ECU 40 calculates the optimum fuel amount "QL" for the small-amount injection based on the past compression-stroke injection amount "Q2". Such calculated amount is memorized in the EEPROM 40a as the learning values for the respective cylinders. The method for calculating the optimum fuel amount "QL" for the small-amount injection is already explained above with reference to FIG. 9.

At a step S22, the ECU 40 determines whether the learning process for the optimum fuel amount "QL" for the small-amount injection has been completed for all of the cylinders. In a case that there is a cylinder for which the learning process has not yet been completed, the fuel injection amounts "Q1" and "Q2" are changed once again and the process moves back to the step S15. When the learning process has been completed for all of the cylinders, the process will be ended.

The learning process may be carried out for the optimum fuel amount "QL" for the small-amount injection in respective ranges of fuel pressure. In other words, it is thought that the fuel injection characteristic of the fuel injection valve 19 will be changed when the fuel pressure is changed. In particular, it is thought that the fuel pressure and the fuel injection amount would not be in a primary relationship in the non-linear area of the fuel injection characteristic. Namely, as shown in FIG. 11, the fuel injection characteristic is changed depending on the fuel pressure, and thereby patterns of variations of the fuel injection characteristic are different in the linear and non-linear areas when the fuel pressure is changed.

Figure 11:
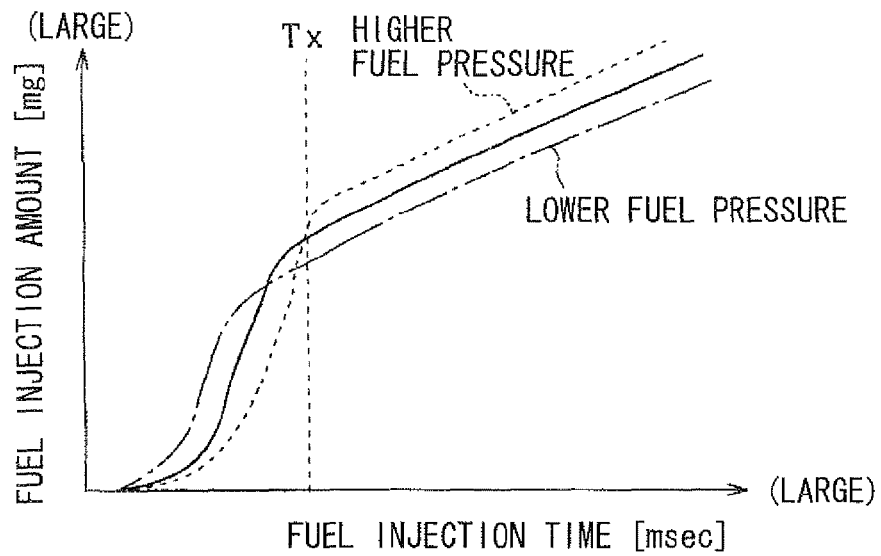
FIG. 11 is a graph showing characteristics of the fuel injection in the compression stroke.
Figure 12:
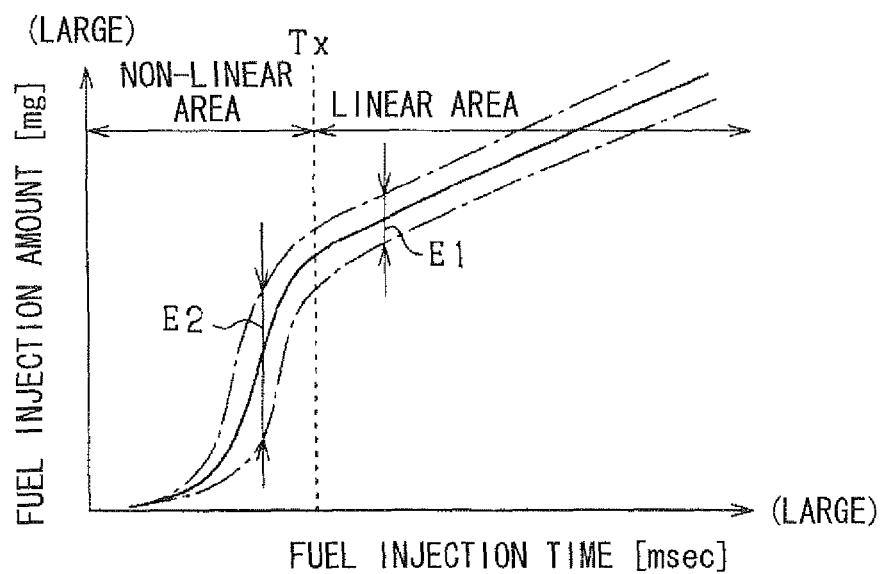
FIG. 12 is a graph showing characteristics of the fuel injection in the compression stroke.

For example, in FIG. 11, in the linear area, the fuel injection amount is increased in accordance with the fuel injection time and the fuel injection amount in a case of the higher fuel pressure is larger than that in a case of the lower fuel pressure. On the other hand, in the non-linear area, the fuel injection amount in the case of the higher fuel pressure is smaller than that in the case of the lower fuel pressure. This is because, in a case of a fuel injection valve of a direct driven type, in which a valve body is moved by an electromagnetic solenoid in a valve opening direction against the fuel pressure, it becomes harder for the valve body to move in the valve opening direction at an initial stage as the fuel pressure is higher. Accordingly, in an area of a shorter fuel injection time (a shorter period of current supply to the solenoid), the fuel injection amount becomes smaller with respect to the fuel injection time, as the fuel pressure becomes higher.

In the present embodiment, the fuel pressure is divided into multiple fuel pressure ranges. The learning process is carried out for the optimum fuel amount "QL" for the small-amount injection for the respective fuel pressure ranges.

More exactly, the ECU 40 carries out the fuel pressure control based on the engine operating condition. Namely, a target fuel pressure is set based on the engine rotational speed, the engine load and so on and a feedback control is carried out so that an actual fuel pressure comes closer and equal to the target fuel pressure. The target fuel pressure is changeable, for example, within a range of 3 to 25 MPa for all of the operating range of the engine, and the target fuel pressure is set at one of values within the range. In particular, so long as the engine is in an idling operation, the target fuel pressure can be changed between 3 to 15 MPa. The split injection is carried out during the idling operation of the cold-start of the engine. Therefore, the ECU 40 divides the target fuel pressure for the idling operation into multiple fuel pressure ranges and memorizes the optimum fuel amount "QL" for the small-amount injection as each learning value for the respective fuel pressure ranges depending on the detected value of the fuel pressure sensor 24.

According to the above structure in which the learning values (the optimum fuel amount "QL" for the small-amount injection) corresponding to the fuel pressures are memorized in the EEPROM 40a, it is possible that the optimum fuel amount "QL" for the small-amount injection may be used as a feed-forward term so as to correct the compression-stroke injection amount, when the target fuel pressure is changed in the fuel pressure control.

Even in a case that the fuel injection time is set at the same value, the compression-stroke injection amount (that is, the amount of the fuel actually injected into the combustion chamber 32 as a result of valve opening at the fuel injection valve 19) may be different from injection to injection due to the cylinder pressure (that is, the pressure in the combustion chamber 32). The learning process for the optimum fuel amount "QL" for the small-amount injection is preferably carried out for respective ranges of the cylinder pressure. For that purpose, the ECU divides the cylinder pressure into multiple cylinder pressure ranges and memorizes the optimum fuel amount "QL" for the small-amount injection as each learning value for the respective cylinder pressure ranges depending on the detected value of the cylinder pressure sensor 24. It is possible to obtain the cylinder pressure by estimation based on the engine operating condition, such as the engine rotational speed, the engine load and so on.

According to the above structure in which the learning values (the optimum fuel amount "QL" for the small-amount injection) corresponding to the cylinder pressures are memorized in the EEPROM 40a, it is possible that the optimum fuel amount "QL" for the small-amount injection may be used as a feed-forward term so as to correct the compression-stroke injection amount, when the engine operating condition is changed.

The above explained embodiment has the following advantages:

According to the present embodiment, the compression-stroke injection amount is gradually (stepwise) decreased and the optimum fuel amount "QL" for the small-amount injection (the basic injection amount) is calculated based on the average value "T30ave" of the pulse intervals "T30", which vary in an increasing direction by the combustions in the respective cylinders, and the standard deviation "σT30". It is, thereby, possible to calculate the optimum fuel amount "QL"

for the small-amount injection, which is a small amount of fuel in the non-linear area for enabling optimization of the combustion condition. Therefore, when the compression-stroke injection is carried by use of the optimum fuel amount "QL" for the small-amount injection, it is possible to carry out an appropriate fuel injection control, which would not be adversely affected by the individual differences and the secular changes of the fuel injection valves 19. As a result, the control accuracy of the fuel injection in the area of the small amount of fuel can be improved. Thereby, it is possible to realize the improvement of the combustion stability as well as reduction of harmful emission of the exhaust gas.

According to the above embodiment, since the optimum fuel amount "QL" for the small-amount injection is calculated for the respective cylinders, it is possible to calculate the optimum basic injection amount (the optimum fuel amount "QL" for the small-amount injection) for each fuel injection valve 19, even when the characteristic of the fuel injection valve 19 differs from cylinder to cylinder.

Furthermore, according to the present embodiment, the learning process for the optimum fuel amount "QL" for the small-amount injection is carried out depending on the fuel pressure. Although the fuel pressure and the fuel injection amount would not be in the primary relationship in the non-linear area of the fuel injection characteristic, it is possible to obtain the optimum learning values corresponding to the fuel pressure. Therefore, the control accuracy can be increased for the compression-stroke injection (the fuel injection of the small amount of fuel).

In addition, although the cylinder pressure and the fuel injection amount would not be in the primary relationship in the non-linear area of the fuel injection characteristic, it is possible to obtain the optimum learning values corresponding to the cylinder pressure. Therefore, the control accuracy can be likewise increased for the compression-stroke injection (the fuel injection of the small amount of fuel).

(Modifications)

The present invention should not be limited to the above embodiment, but may be modified in various manners as below:

(1) A rotation detecting position (a "T30" detecting position) for detecting the pulse intervals "T30" may be changed depending on the engine operating condition. More exactly, the rotation detecting position is changed to an advancing side or a retarding side depending on cylinder temperature. For example, the angular range of AIDC 20° CA to AIDC 50° CA is set as a basic detecting position, and the rotation detecting position is changed to the retarding side by a larger amount, with respect to the basic detecting position, as the cylinder temperature is lower, while the rotation detecting position is changed to the advancing side by a larger amount as the cylinder temperature becomes higher.

According to such a modification, even when a peak position of the engine rotational speed is changed in each of cylinders depending on the engine operating condition, the rotation detecting position can be properly changed in accordance with such change of the peak position. As a result, the pulse intervals "T30" (corresponding to the engine rotational speed), which reflects more exactly the current combustion condition, can be obtained in the calculation for the optimum fuel amount "QL" for the small-amount injection.

(2) The optimum fuel amount "QL" for the small-amount injection, which is calculated based on the average value "T30ave" of the pulse intervals "T30", may be set as a first provisional learning value (a first provisional injection amount), while the optimum fuel amount "QL" for the small-amount injection, which is calculated based on the standard deviation "σT30", may be set as a second provisional learning value (a second provisional injection amount). And then, either the first or the second provisional learning value may be selected as a final value for the optimum fuel amount "QL" for the small-amount injection.

In the above modification, temperature of the engine cooling water at the cold-start of the engine 11 (cooling-water temperature at the engine cold-start) is detected. In a case that the cooling-water temperature at the engine cold-start is lower than a predetermined value (for example, 5° C.), the second provisional learning value is selected as the final value for the optimum fuel amount "QL" for the small-amount injection. On the other hand, in a case that the cooling-water temperature at the engine cold-start is higher than the predetermined value (for example, 5° C.), the first provisional learning value is selected as the final value for the optimum fuel amount "QL" for the small-amount injection.

When the temperature of the engine cooling water at the cold-start of the engine 11 is relatively low, friction in the engine 11 is rather high, and thereby variation (dispersion) of the engine rotational speed becomes larger. Therefore, it is thought that the use of the standard deviation "σT30" is better than the average value "T30ave" of the pulse intervals "T30", when grasping the variation of the combustion condition caused by different compression-stroke injection amount. Therefore, according to the present modification, the optimum fuel amount "QL" for the small-amount injection can be calculated more exactly even when the engine cooling water at the cold-start of the engine 11 is low.

(3) In a case that the learning process for the optimum fuel amount "QL" for the small-amount injection has not yet been carried out, a first preliminary learning value is calculated based on the standard deviation "σT30" and such first preliminary learning value is set as the optimum fuel amount "QL" for the small-amount injection. On the other hand, in a case that the learning process for the optimum fuel amount "QL" for the small-amount injection has been carried out, a second preliminary learning value is calculated based on the average value "T30ave" and such second preliminary learning value is set as the optimum fuel amount "QL" for the small-amount injection. A number of samples "n1" of the pulse intervals "T30" for calculating the standard deviation "σT30" may be made larger than a number of samples "n2" for calculating the average value "T30ave" (n1>n2). This is because it is desirable to get the learning values as early as possible in the case that the leaning process has not yet been carried out. Since a relatively large number of samples are necessary in order to precisely calculate the standard deviation "σT30", it takes a certain time for calculating the learning value. On the other hand, the number of samples may be reduced for calculating the average value "T30ave".

According to the above modification, in which the method for calculating the optimum fuel amount "QL" for the small-amount injection is changed between the cases in which the learning process has been carried out or has not been carried out, it is possible to get the learning value earlier in the case that the learning process has not yet been carried out. In addition, accuracy for the learning value can be increased when the learning process will be carried out once again (when the learning value will be renewed) in the case that the learning process has been already carried out.

(4) In the process of FIG. 10, the number of samples for the pulse intervals "T30" may be changed between the case in which the learning process for the optimum fuel amount "QL" for the small-amount injection has not yet been carried out (namely, the learning process for the first time) and the case in which the learning process for the optimum fuel amount "QL" for the small-amount injection has been already carried out (namely, the learning process for the second time on and after). Namely, in the case that the learning process has not yet been carried out, the number of the samples may be made relatively at a smaller number, while in the case that the learning process has been already done, the number of the samples may be increased.

(5) When carrying out the learning process for the optimum fuel amount "QL" for the small-amount injection for the first time, the optimum fuel amount "QL" for the small-amount injection may be calculated based on the standard deviation "σT30". And when carrying out the learning process for the optimum fuel amount "QL" for the small-amount injection for the second time and thereafter, the optimum fuel amount "QL" for the small-amount injection may be calculated based on the average value "T30ave".

(6) In a case that the learning process will be done for the optimum fuel amount "QL" for the small-amount injection once again after the learning process has been completed (namely, when the learning value will be renewed), it may be possible to make smaller a range for changing the fuel injection amount in the non-linear area when changing the compression-stroke injection amount. Alternatively, it may be possible to make the varying amount "ΔQ" smaller for the compression-stroke injection amount for each injection. For example, in a process of renewing the learning value, the initial value for changing the compression-stroke injection amount is not set at the value of "Qmin (the minimum fuel injection amount in the linear area) −ΔQ", but the compression-stroke injection amount will be started with such a fuel injection amount smaller than "Qmin−ΔQ" based on the previous learning value (the optimum fuel amount "QL" for the small-amount injection). As a result, it is possible to increase the accuracy of the learning process in case of the re-learning process.

(7) In the above embodiment, both of the average value "T30ave" of the pulse intervals "T30" (the engine angular speed) and the standard deviation "σT30" are calculated for the learning process of the optimum fuel amount "QL" for the small-amount injection. It may be so modified that either the average value "T30ave" or the standard deviation "σT30" is calculated.

(8) It may be also possible to use the engine angular speed which is calculated as the inverse number of the pulse intervals "T30", as data for representing the engine rotational speed instead of the pulse intervals "T30". In this case, the optimum fuel amount "QL" for the small-amount injection is calculated based on the average value of the engine angular speed.

In addition, a variance may be used instead of the standard deviation "σT30", as a dispersion (an index) indicating a range of variation of the engine rotational speed. The variance is calculated as a square value of the standard deviation "σT30". In this case, the optimum fuel amount "QL" for the small-amount injection is calculated based on the data for the variance.

(9) In the above embodiment, when the optimum fuel amount "QL" for the small-amount injection is calculated based on the pulse intervals "T30", more exactly, based on the average value "T30ave" of the pulse intervals "T30". However, the pulse intervals "T30" (not the average value thereof) may be directly used. Alternatively, an integrated amount of the pulse intervals "T30" may be used for calculating the optimum fuel amount "QL" for the small-amount injection.

(10) In the above embodiment, when the learning process is carried out for the optimum fuel amount "QL" for the small-amount injection, the compression-stroke injection amount is reduced in a stepwise by the predetermined constant value of the varying amount "ΔQ". The varying amount "ΔQ" may be changed for each compression-stroke injection in one learning process. Furthermore, the compression-stroke injection amount may be changed not in the decreasing direction but in an increasing direction.

What is claimed is:

1. A fuel injection control system for a direct-injection engine comprising:
   fuel injection valves for directly injecting fuel into respective cylinders of the engine; and
   an electronic control unit for controlling fuel injections by the fuel injection valves to carry out a split injection, which includes a fuel injection in an intake stroke and a fuel injection in a compression stroke of the engine,
   wherein the electronic control unit includes:
   an injection-amount changing portion for gradually increasing or decreasing amount of fuel injection in the compression stroke when the split injection is carried out;
   a rotation detecting portion for detecting rotational speed of the engine, which is changed by combustion of the injected fuel, for respective fuel injections an amount of which is increased or decreased by the injection-amount changing portion;
   a compression stroke injection amount calculating portion for calculating the amount of the fuel injection, with which the rotational speed of the engine becomes maximum, and setting such amount as a compression stroke injection amount for the fuel injection in the compression stroke; and
   an injection controlling portion for controlling the amount of the fuel injection in the compression stroke based on the compression stroke injection amount, after the compression stroke injection amount has been calculated by the compression stroke injection amount calculating portion.

2. The fuel injection control system according to the claim 1, wherein
   the electronic control unit further includes:
   a dispersion calculating portion for calculating a dispersion indicating a range of variation of the rotational speed of the engine, based on the rotational speed of the engine detected by the rotation detecting portion, during an engine operating period in which the amount of the fuel injection in the compression stroke is set at the same amount to the other fuel injections in the compression stroke; and
   the compression injection amount calculating portion includes:
   a first calculating portion for calculating the amount of the fuel injection increased or decreased by the injection-amount changing portion, with which the rotational speed of the engine detected by the rotation detecting portion becomes maximum, and setting such amount of the fuel injection at a first provisional injection amount;
   a second calculating portion for calculating the amount of the fuel injection increased or decreased by the injection-amount changing portion, with which the dispersion calculated by the dispersion calculating portion becomes minimum, and setting such amount of the fuel injection at a second provisional injection amount; and
   a third calculating portion for calculating the compression stroke injection amount based on the first and second provisional injection amounts.

3. The fuel injection control system according to the claim 2, further comprising:

a temperature sensor for detecting temperature of the engine at starting the engine;

wherein the compression stroke injection amount calculating portion of the electronic control unit operates in a way that:

when the temperature of the engine is lower than a predetermined value, the second provisional injection amount is set as the compression stroke injection amount, and when the temperature of the engine is higher than the predetermined value, the first provisional injection amount is set as the compression stroke injection amount.

4. The fuel injection control system according to the claim 2, further comprising:

a learning control portion for memorizing the compression stroke injection amount as a learning value in a back-up memory device;

wherein the compression stroke injection amount calculating portion of the electronic control unit operates in a way that:

when a learning process for the compression stroke injection amount has not yet been carried out by the learning control portion, the first provisional injection amount is set as the compression stroke injection amount, and when the learning process for the compression stroke injection amount has been carried out by the learning control portion, the second provisional injection amount is set as the compression stroke injection amount.

5. The fuel injection control system according to the claim 1, further comprising:

a learning control portion for memorizing the compression stroke injection amount as a learning value in a back-up memory device; and a fuel pressure sensor for detecting pressure of the fuel to be injected from the fuel injection valves, wherein the pressure of fuel is divided into multiple fuel pressure ranges, and wherein a learning process for the compression stroke injection amount is carried out by the learning control portion for respective fuel pressure ranges.

6. The fuel injection control system according to the claim 1, further comprising:

a learning control portion for memorizing the compression stroke injection amount as a learning value in a back-up memory device; and a cylinder pressure sensor for detecting a cylinder pressure, which is a pressure in a combustion chamber of the engine, wherein the cylinder pressure is divided into multiple cylinder pressure ranges, and wherein a learning process for the compression stroke injection amount is carried by the learning control portion for respective cylinder pressure ranges.

7. The fuel injection control system according to the claim 1, wherein the rotation detecting portion detects the rotational speed of the engine at such a rotation detecting position for respective cylinders, which corresponds to an angular position of an engine crankshaft after a combustion in each of the cylinder, wherein the rotation detecting position is changed depending on an operating condition of the engine.

8. A fuel injection control system for a direct-injection engine comprising:

fuel injection valves for directly injecting fuel into respective cylinders of the engine; and an electronic control unit for controlling fuel injections by the fuel injection valves to carry out a split injection, which includes a fuel injection in an intake stroke and a fuel injection in a compression stroke of the engine, wherein the electronic control unit includes:

an injection-amount changing portion for gradually increasing or decreasing amount of fuel injection in the compression stroke when the split injection is carried out;

a rotation detecting portion for detecting rotational speed of the engine, which is changed by combustion of the injected fuel, for respective fuel injections an amount of which is increased or decreased by the injection-amount changing portion;

a dispersion calculating portion for calculating a dispersion indicating a range of variation of the rotational speed of the engine, based on the rotational speed of the engine detected by the rotation detecting portion, during an engine operating period in which the amount of the fuel injection in the compression stroke is set at the same amount to the other fuel injections in the compression stroke; and a compression stroke amount calculating portion for calculating the amount of the fuel injection, with which the dispersion detected by the dispersion calculating portion becomes maximum, and setting such amount as a basic injection amount for the fuel injection in the compression stroke; and an injection controlling portion for controlling the amount of the fuel injection in the compression stroke based on the basic injection amount, after the basic injection amount has been calculated by the compression stroke injection amount calculating portion.

9. The fuel injection control system according to the claim 8, further comprising:

a learning control portion for memorizing the basic injection amount as a learning value in a back-up memory device; and a fuel pressure sensor for detecting pressure of the fuel to be injected from the fuel injection valves, wherein the pressure of fuel is divided into multiple fuel pressure ranges, and wherein a learning process for the basic injection amount is carried out by the learning control portion for respective fuel pressure ranges.

10. The fuel injection control system according to the claim 8, further comprising:

a learning control portion for memorizing the basic injection amount as a learning value in a back-up memory device; and a cylinder pressure sensor for detecting a cylinder pressure, which is a pressure in a combustion chamber of the engine, wherein the cylinder pressure is divided into multiple cylinder pressure ranges, and wherein a learning process for the basic injection amount is carried out by the learning control portion for respective cylinder pressure ranges.

11. The fuel injection control system according to the claim 8, wherein the rotation detecting portion detects the rotational speed of the engine at such a rotation detecting position for respective cylinders, which corresponds to an angular position of an engine crankshaft after a combustion in each of the cylinder, wherein the rotation detecting position is changed depending on an operating condition of the engine.

* * * * *